Sept. 6, 1932.   F. C. GUERRLICH   1,875,865
AUXILIARY BRAKE OPERATING MECHANISM FOR MOTOR VEHICLES
Filed Feb. 19, 1931   3 Sheets-Sheet 1
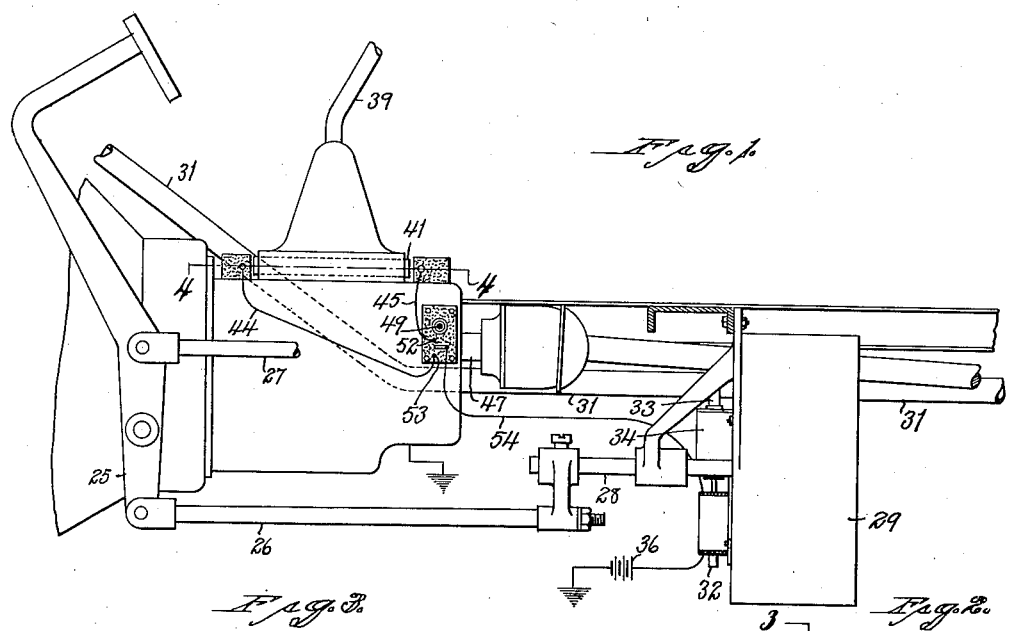
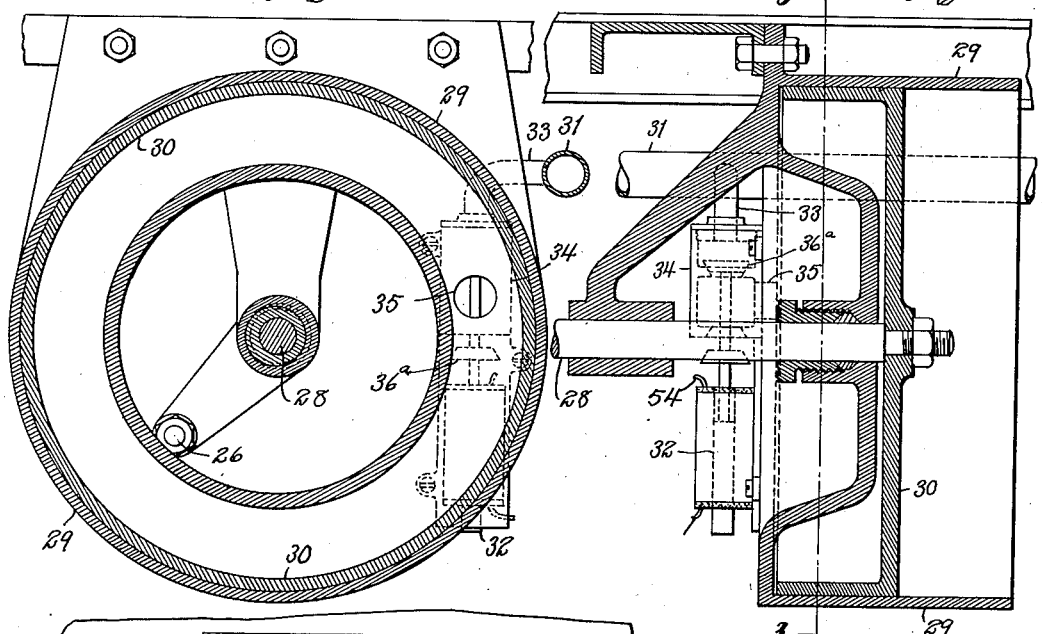
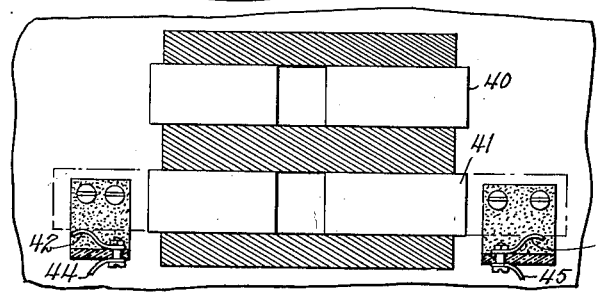
Inventor
Frederick C. Guerrlich
by Seymour Earle & Nichols
Attys Sept. 6, 1932.   F. C. GUERRLICH   1,875,865
AUXILIARY BRAKE OPERATING MECHANISM FOR MOTOR VEHICLES
Filed Feb. 19, 1931   3 Sheets-Sheet 2
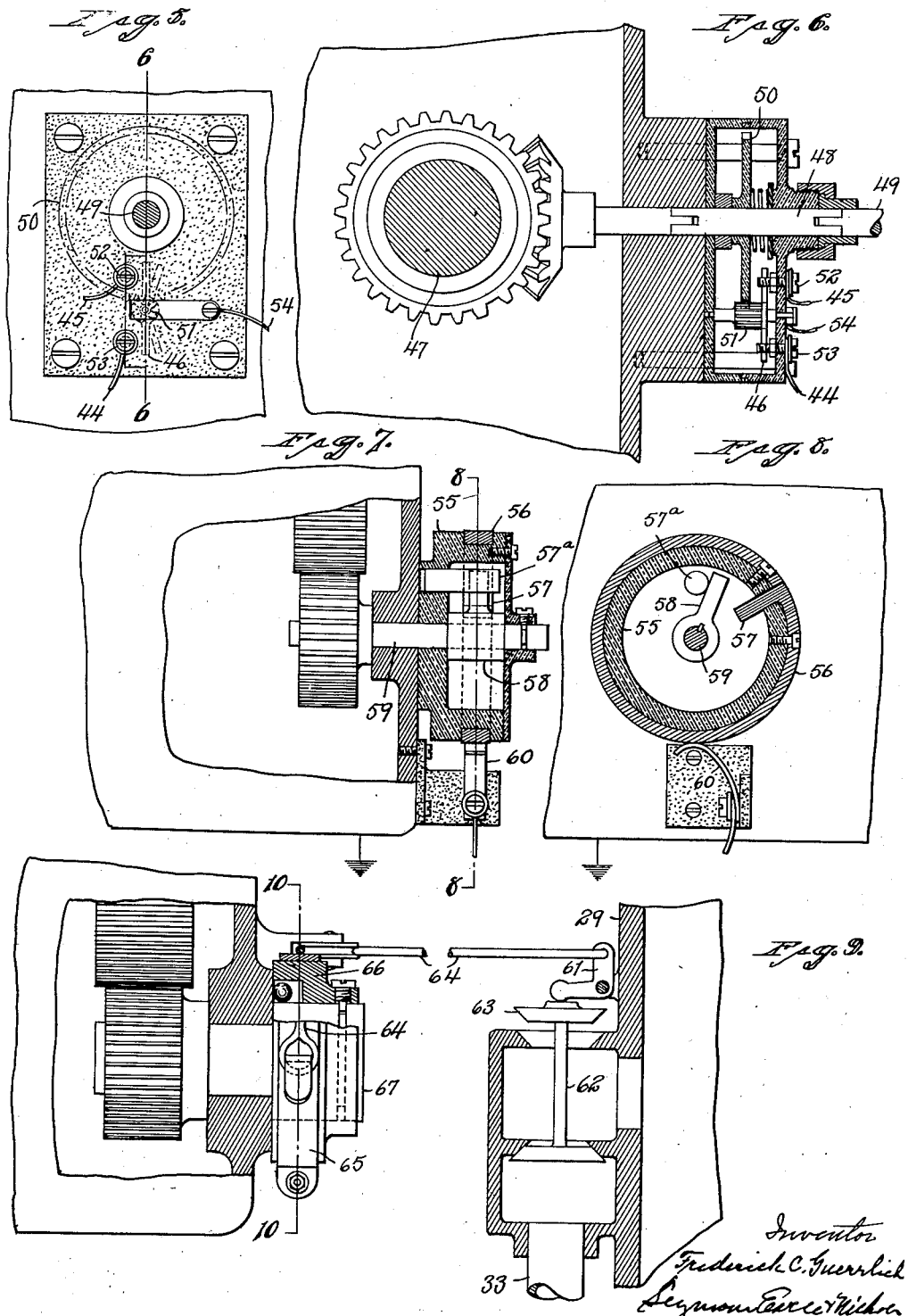

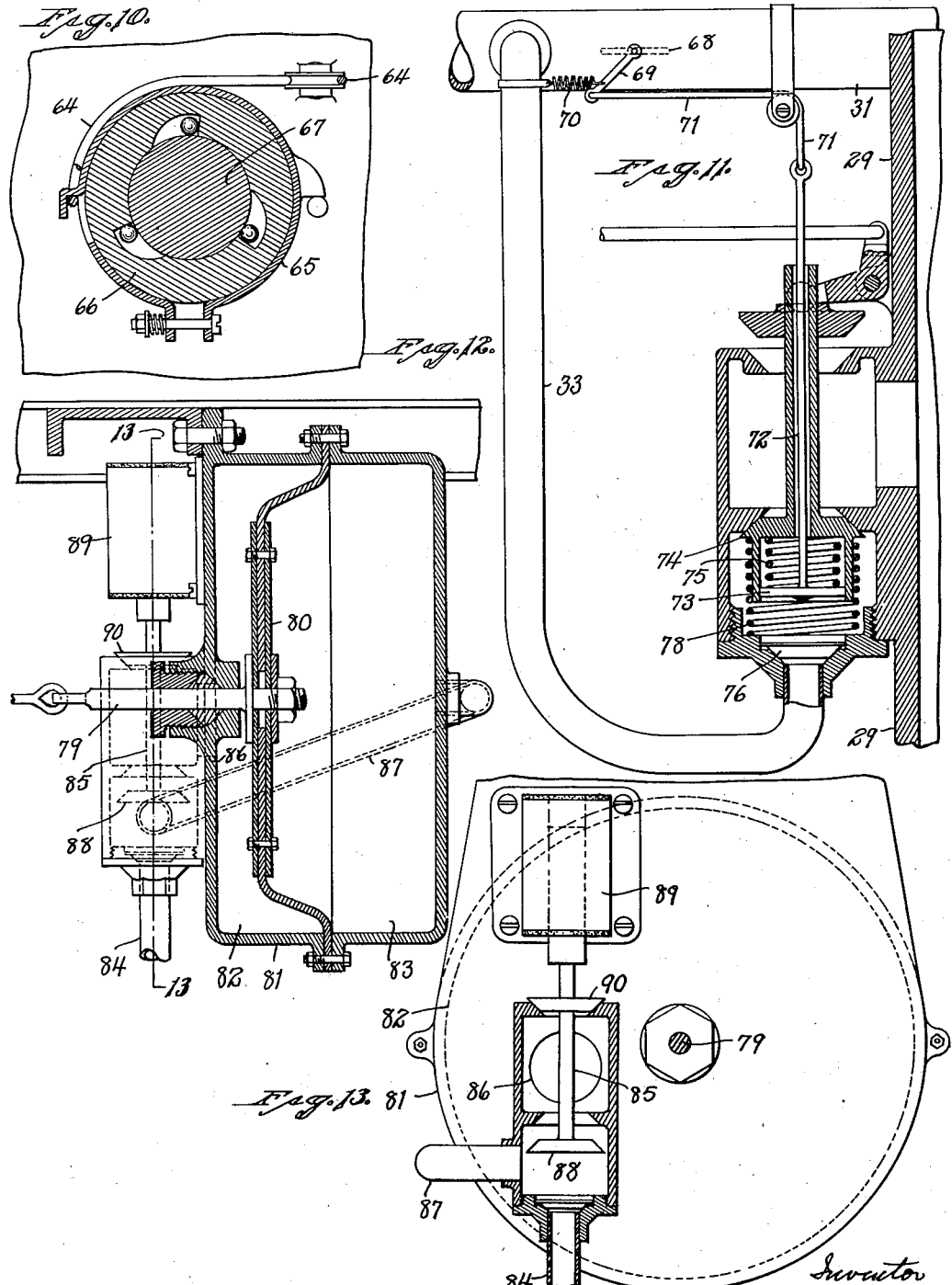

Patented Sept. 6, 1932

1,875,865

UNITED STATES PATENT OFFICE

FREDERICK C. GUERRLICH, OF GUILFORD, CONNECTICUT

AUXILIARY BRAKE-OPERATING MECHANISM FOR MOTOR VEHICLES

Application filed February 19, 1931. Serial No. 516,877.

This invention relates to an improvement in auxiliary brake-operating mechanisms for motor vehicles, that is, supplemental means for applying the brakes of an automobile when the car tends to move in a direction opposite to that for which the transmission gears have been set by the driver. Perhaps one of the most difficult operations for most automobile drivers is to start the car on an up-grade because of the fact that one foot must be kept on the clutch-pedal and the other on the brake. At the same time, it is necessary to feed the gas to the engine by hand, or to hold the car from rolling backward by the hand-brake, and use the accelerator-pedal. It takes much practice to do this.

The object of this invention is to provide automatic means for applying the brakes when the car tends to move in a direction opposite to which the transmission-gears are set, and to automatically release the brake the instant the clutch takes hold, so that the car tends to be driven forward by the engine, making it possible to start the car on an up-grade, just as is done on the level ground; in effect, it provides the operator with a "third foot," and the invention consists in the construction as hereinafter described and particularly recited in the claims.
In the accompanying drawings:

Fig. 1 is a side view illustrating one form of auxiliary brake-operating means for motor vehicles;

Fig. 2 is a vertical sectional view of the operating-piston and cylinder therefor, with connecting parts;

Fig. 3 is a sectional view on the line 3—3 of Fig. 2;

Fig. 4 is a sectional view on the line 4—4 of Fig. 1;

Fig. 5 is a front view illustrating one form of electric control for the valve-control of the cylinder;

Fig. 6 is a sectional view on the line 6—6 of Fig. 5, on an enlarged scale;

Fig. 7 is a sectional view illustrating a modified form of electrical control;

Fig. 8 is a sectional view on the line 8—8 of Fig. 7;
Fig. 9 is a view partly in section and partly in side elevation illustrating a further modification of piston-control;

Fig. 10 is a sectional view on the line 10—10 of Fig. 9;

Fig. 11 illustrates means for controlling the pressure in the operating-piston;

Fig. 12 illustrates a modified form of auxiliary brake-mechanism showing the mechanism operated by a diaphragm instead of a piston; and

Fig. 13 is a sectional view on the line 13—13 of Fig. 12.

One of the brake-levers—either foot or emergency, as may be chosen when the device is installed—is provided with an extension 25 to which is pivoted an auxiliary brake-bar 26 parallel with the regular brake-bar 27. The auxiliary-bar 26, or an extension-bar 28 thereof, extends into a cylinder 29 and is connected with a piston 30 therein, this piston being operated by exhaust from the exhaust-pipe 31 of the engine. There is always back pressure in this exhaust-pipe, and while it may be comparatively low, the said cylinder and piston can be made large enough in proportion to give ample pressure or "pull" for the application of the brakes. The admission of the exhaust gases into the brake-applying cylinder is regulated and controlled by an electro-magnetically-operated valve 32 of the solenoid type, although, because of the small movement of the valves, many other well-known types of electro-magnets might be used.

The pipe 33 from the exhaust enters a cylinder 34 which has a port 35 entering the cylinder 29 forward of the piston 30, and in this cylinder 34 is a valve 36ª controlled by the electro-magnet 32. This magnet 32 may be controlled in a variety of ways. The current to operate the electro-magnet is obtained from a battery 36 and its flow to the coil of the magnet is controlled by a switch operated by some of the moving parts of the power-transmitting mechanism.

In practically all modern cars, the gears are shifted by means of a hand-shifting lever 39 which operates shift-bars 40 and 41 in the usual manner. In line with one of the bars, as 41, are contact spring-fingers 42 and 43, these spring-fingers being connected by wires 44 and 45 with a switch-control mechanism as shown in Figs. 5 and 6 of the drawings and which includes a two-way switch. A contact-arm 46 is driven by friction from the propeller shaft 47, or preferably, and as shown in Fig. 6, a connecter-shaft 48 may be made in the speedometer-shaft 49. The arm 46 is driven from the shaft 48 through a gear-wheel 50 meshing with a pinion 51 which carries the arm 46. The wires 44 and 45 terminate in contact-lugs 52 and 53 which, through the arm 46, make or break a circuit through the wire 54 to the magnet 32.

Thus, the operation is as follows:

When the gears are set for first speed forward, the transmission-bar 41 will touch the contact spring-finger 42, and when the car is moving forward, the arm 46 will make contact with the lug 52, which lug will make contact with the wire 44 leading to the terminal-lug 43, and at the same time the arm 46 will be in engagement with the terminal 52, so that no circuit is passing to the battery 36. Thus, there will be no electric circuit through the magnet but if the car tends to reverse, then the arm 46 will make engagement with the lug 53, completing a circuit to the magnet 32, causing it to allow the pressure from the exahust to enter the cylinder 29 and force the piston 30 rearward, so as to apply the brakes and hold the car against movement in the direction opposite to that to which the transmission-gears are set.

It is obvious, as shown in Figs. 7 and 8, that instead of the electrical connections just described, the current may be controlled by a non-conducting drum 55 which is not fastened to the shaft, but revolves freely on it. On the periphery of the drum is a conductor-ring 56 which has a lug 57, which lug may be driven by an arm 58 rigidly fastened to a shaft 59. A collector-brush 60 is mounted to contact with the ring 56, current from the battery, by way of the coil, being led to the collector-brush and from there to the magnet 32.

When the car is moving in the direction in which the gears are set, the arm 58 strikes the non-conducting lug 57ª and so drives the drum and there is no electric contact. When, however, the car moves in a direction opposite to that for which the gears are set, the arm 58 strikes the lug 57, making electric contact, so as to complete an electric current from the battery through the electro-magnet coil and then to the brush, the ring, lug-arm, and so the ground, the battery also being grounded. Because of the fact that the secondary, or reverse, gears, always travel in the same direction, whether the gears are set in forward or reverse, changing their direction only when the car moves in a direction opposite that for which the gears are set, a simple electric switch, such as just described, can be used when it is actuated from these gears.

It is obvious that instead of operating the valve 36ª electrically, it may be done mechanically, as shown in Figs. 9 and 10 of the drawings, in which a bell-crank-lever 61 is mounted to operate the valve-stem 62 of a valve 63 corresponding to the valve 36ª and connecting this bell-crank-lever by a cable 64 with a band 65 frictionally held upon a clutch 66 adapted to couple with an auxiliary-shaft 67 of the transmission, this clutch being adapted to ride freely in one direction but to positively engage the shaft in the opposite direction, and the band 65 is adjustably mounted upon the clutch-member so that after the valve has been operated, any further draft upon the cable 64 will permit the band to slip on the clutch-member without moving.

To regulate the pressure from the exhaust, if more pressure is required, a damper 68 is provided with a lever 69 which is held in the open position by a spring 70, and the lever is connected by a cable 71 with a piston-rod 72 connected with a piston 73 in the spring-operated valve 74, which corresponds to the valve 36ª controlling pressure into or from the cylinder 29, as shown in Fig. 11.

When the valve is opened to let pressure or exhaust gases into the cylinder, the piston 73 will also be moved, thus putting a tension on the cable 71 and so closing the damper in the exhaust-pipe 31. When the pressure in the cylinder is at a predetermined point, or pressure which will be determined by the tension of the spring 75, the piston 73 will be pressed against the spring 75, thus releasing the pull on the cable 71, and so permitting the damper to open by the action of the return spring 70. The pressure in the cylinder will then be maintained by a check-valve 76, the valve 74 being forced toward its closed position by a spring 78.

As shown in Figs. 12 and 13, instead of connecting the brake-extension 28 with the piston 30 in the cylinder 29, the brake-extension 79 corresponding to the extension 28 may be connected with a diaphragm 80 in a casing 81 forming chambers 82 and 83. Connection is made from the manifold through a pipe 84 acting on a valve 85, so as to create a vacuum in the chamber 82 through a port 86 and through a pipe 87 to the chamber 83, one of these pipes being controlled by a valve 88 operated by a solenoid battery 89 connected as before described.

In the ordinary movement of the car, the diaphragm remains stationary, but if the car tends to move in the direction opposite to which the gears are set, the solenoid is energized to close the valve 88, which closes the port 86 and, at the same time, opening the valve 90, allowing air to enter the chamber 82. At the same time the pressure in the chamber 83 is increased so as to cause the diaphragm to snap rearward and move the shaft 79 to apply the brakes, as before described.

I claim:

1. In a motor vehicle, the combination with the transmission-mechanism and brake-mechanism, of automatic means for applying the brakes when the vehicles moves in a direction opposite to that for which the transmission-mechanism is set, the said automatic means including a cylinder and a piston, the said piston connected with the brake-mechanism, and means for supplying fluid-pressure to move said piston when the vehicle moves in a direction opposite to that for which the transmission-mechanism is set.

2. In a motor vehicle, the combination with the transmission-mechanism and brake-mechanism, of automatic means for applying the brakes when the vehicle moves in a direction opposite to that for which the transmission-mechanism is set, the said automatic means including a piston, fluid pressure operating on said piston, the said piston connected with the brake-mechanism, and means for moving the piston when the vehicle moves in a direction opposite to that for which the transmission-mechanism is set.

3. In a motor vehicle, the combination with the transmission-mechanism and brake-mechanism, of means for applying the brake when the vehicle moves in a direction opposite to that for which the transmission-mechanism is set, said means including a cylinder and a piston, means for supplying pressure in said cylinder to move said piston, a valve controlling the said pressure, and automatic means for operating said valve.

4. In a motor vehicle, the combination with the transmission-mechanism and brake-mechanism, of means for applying the brake when the vehicle moves in a direction opposite to that for which the transmission-mechanism is set, said means including a cylinder and a piston, means for supplying pressure in said cylinder to move said piston, a valve controlling the said pressure, and electrically-operated means for operating said valve.

5. In a motor vehicle, the combination with the transmission-mechanism and brake-mechanism, of means for applying the brake when the vehicle moves in a direction opposite to that for which the transmission-mechanism is set, said means including a cylinder and a piston, means for supplying pressure in said cylinder from the exhaust to move said piston, a valve controlling the said pressure, and electrically-operated means for operating said valve.

6. In a motor vehicle, the combination with the transmission-mechanism and brake-mechanism, of a cylinder and piston, of an auxiliary brake-actuating-mechanism, means for moving said auxiliary brake-mechanism by said piston, and means controlled by the movement of the vehicle to place said auxiliary-actuating-mechanism in operation when the vehicle moves in a direction opposite to that for which the transmission-mechanism is set.

7. In a motor vehicle, the combination with the transmission-mechanism and brake-mechanism, of a cylinder and piston, of an auxiliary brake-actuating-mechanism, means operated by the transmission for moving said auxiliary brake-mechanism by varying the fluid-pressure on the said piston, and means controlled by the movement of the vehicle to place said auxiliary-mechanism in operation when the vehicle moves in a direction opposite to that for which the transmission-mechanism is set.

In testimony whereof, I have signed this specification.

FREDERICK C. GUERRLICH.